(No Model.) 6 Sheets—Sheet 1.

A. LIEBER.
HOOP DRIVING MACHINE.

No. 559,856. Patented May 12, 1896.

Witnesses
Louis G. Julihn.
Eric G. Julihn.

Inventor
Albert Lieber.
By Hopkins & Atkins.
Attorneys (No Model.) 6 Sheets—Sheet 2.
A. LIEBER.
HOOP DRIVING MACHINE.
No. 559,856. Patented May 12, 1896.
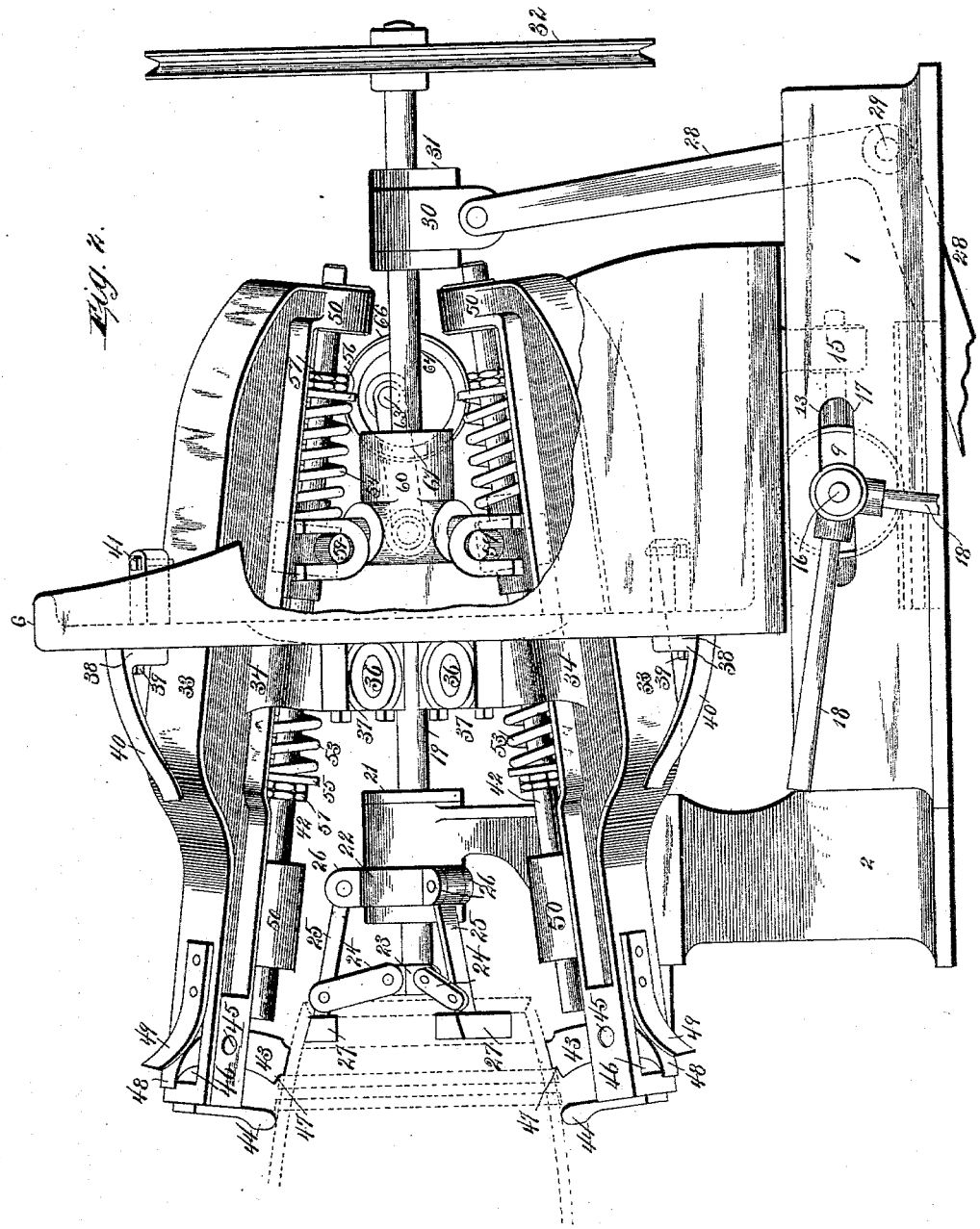
Witnesses
Louis G. Julihn.
Eric G. Julihn.
Inventor
Albert Lieber.
By Hopkins & Atkins.
Attorney (No Model.) 6 Sheets—Sheet 3.
A. LIEBER.
HOOP DRIVING MACHINE.
No. 559,856. Patented May 12, 1896.
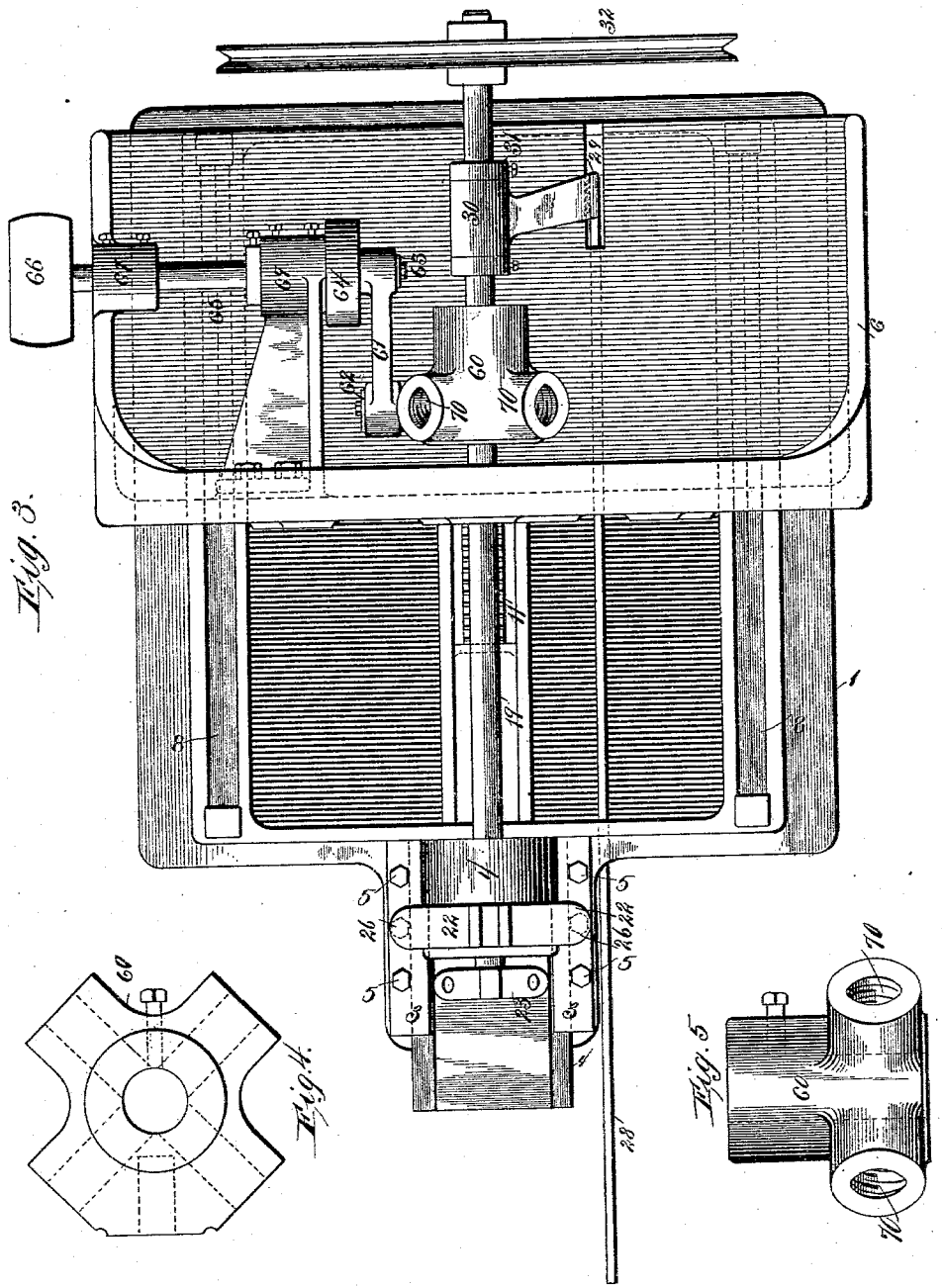
Witnesses
Louis G. Julihn
Eric G. Julihn
Inventor
Albert Lieber
By Hopkins & Atkins.
Attorneys.

(No Model.)  6 Sheets—Sheet 4.
A. LIEBER.
HOOP DRIVING MACHINE.
No. 559,856.  Patented May 12, 1896.
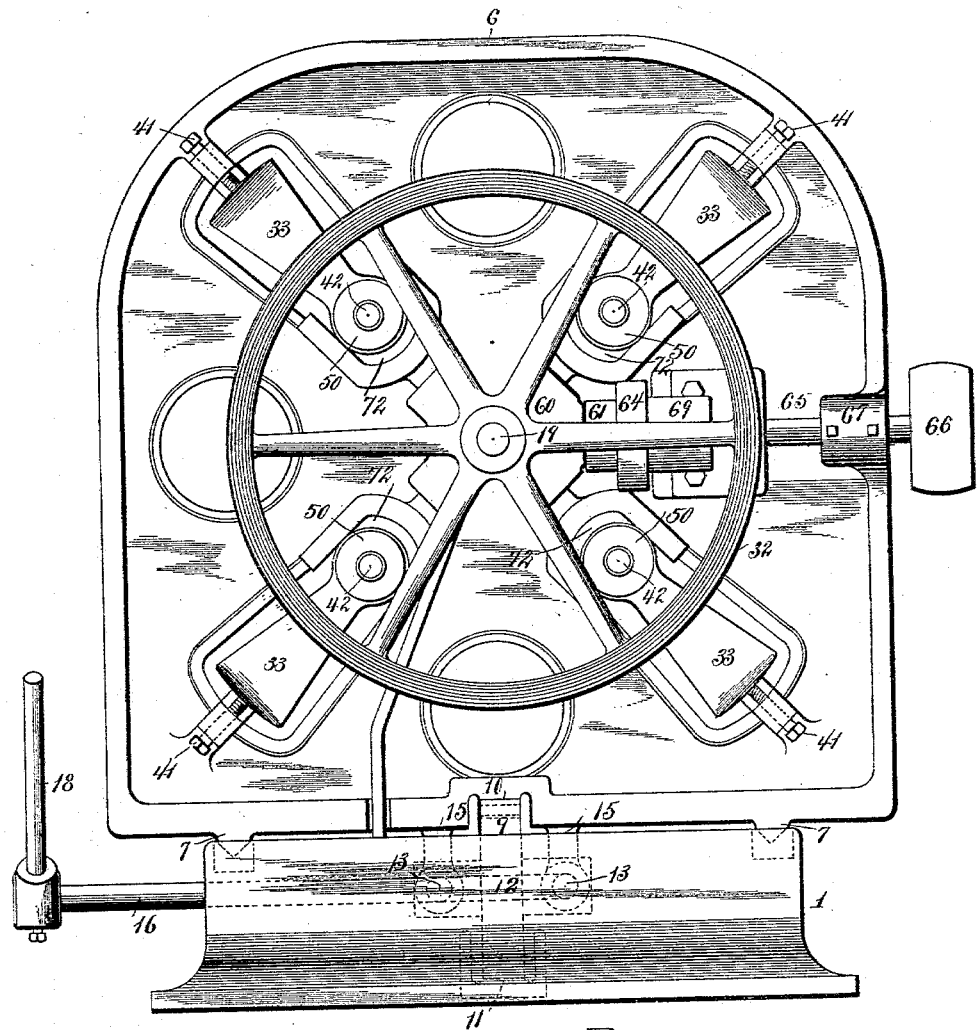
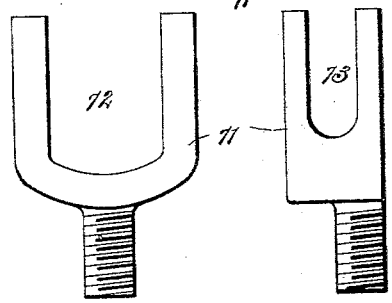
Witnesses  Inventor
Louis G. Julihn.  Albert Lieber.
Epic G. Julihn.  By Hopkins & Atkins.
   Attorneys (No Model.) 6 Sheets—Sheet 5.

A. LIEBER.
HOOP DRIVING MACHINE.

No. 559,856. Patented May 12, 1896.

Witnesses
Louis G. Julihn
Eric G. Julihn

Inventor
Albert Lieber
By Hopkins & Atkins
Attorneys

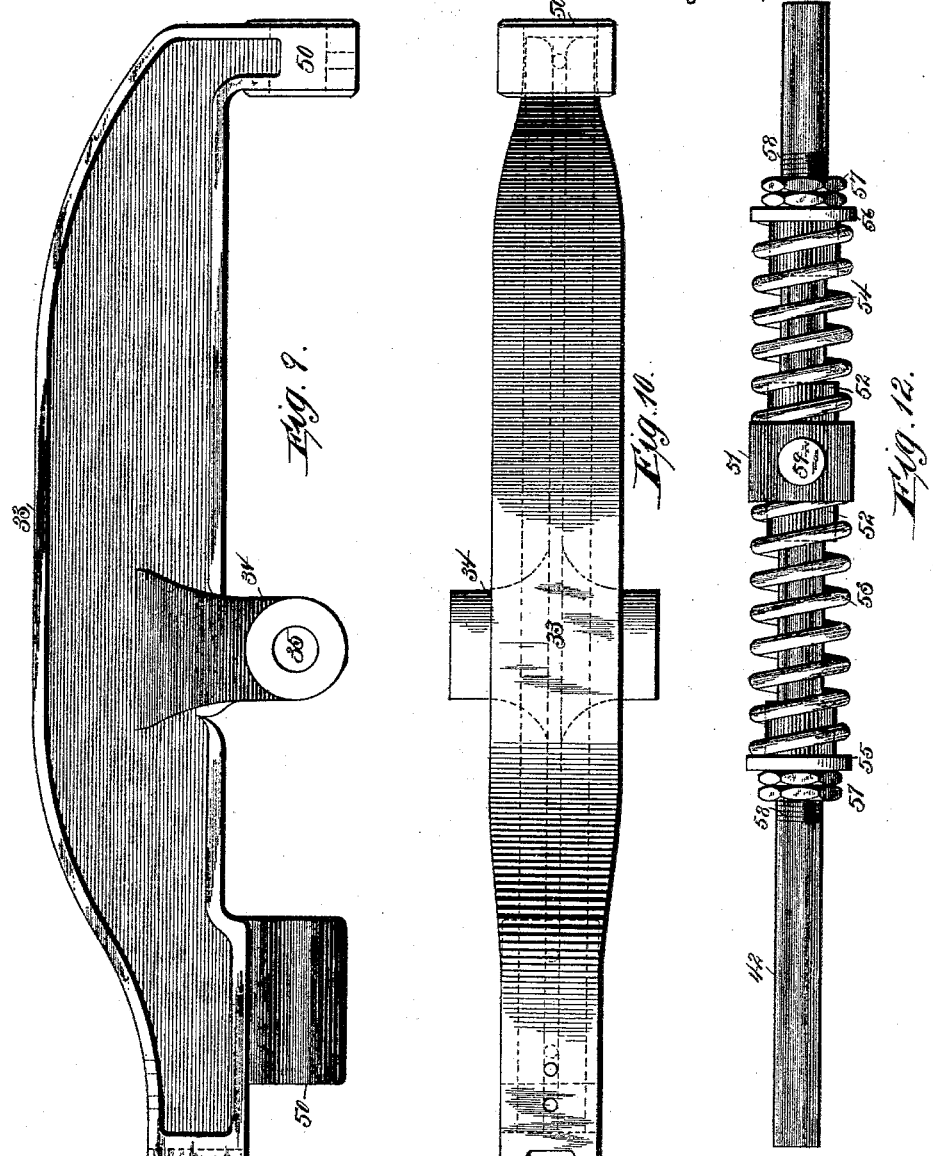

UNITED STATES PATENT OFFICE.

ALBERT LIEBER, OF INDIANAPOLIS, INDIANA.

HOOP-DRIVING MACHINE.

SPECIFICATION forming part of Letters Patent No. 559,856, dated May 12, 1896.

Application filed October 20, 1892. Serial No. 449,476. (No model.)

*To all whom it may concern:*

Be it known that I, ALBERT LIEBER, of Indianapolis, county of Marion, and State of Indiana, have invented certain new and useful Improvements in Hoop-Driving Machines, of which the following is a specification, reference being had to the accompanying drawings.

The object of my invention is to produce a machine for driving the hoops of kegs for lager-beer or the like and which, on account of the convenient construction and arrangement of the parts, and particularly the employment of the mechanically-actuated drivers, accomplishes better results than hoop-driving machines heretofore in use.

Figure 1:
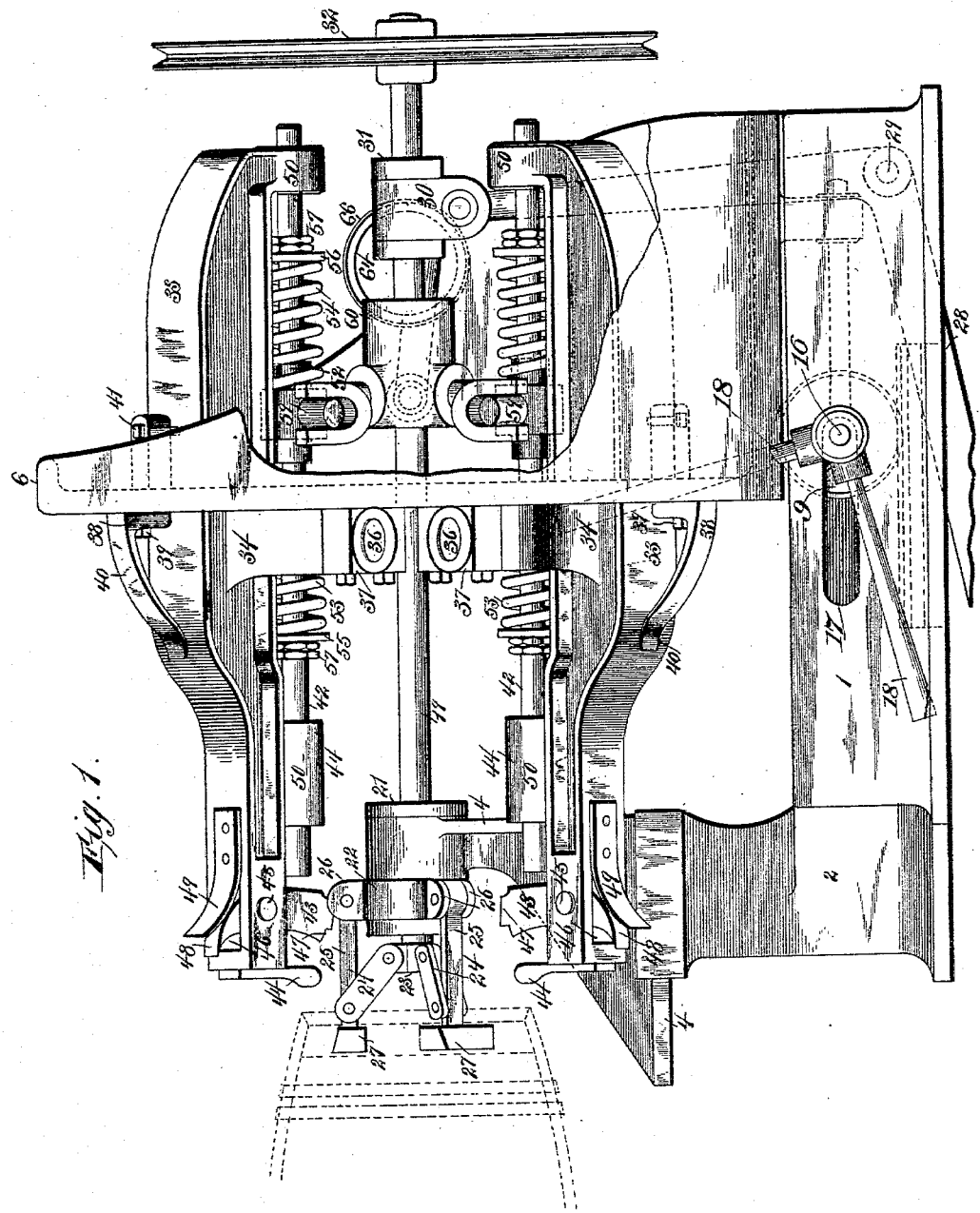
Figure 7:
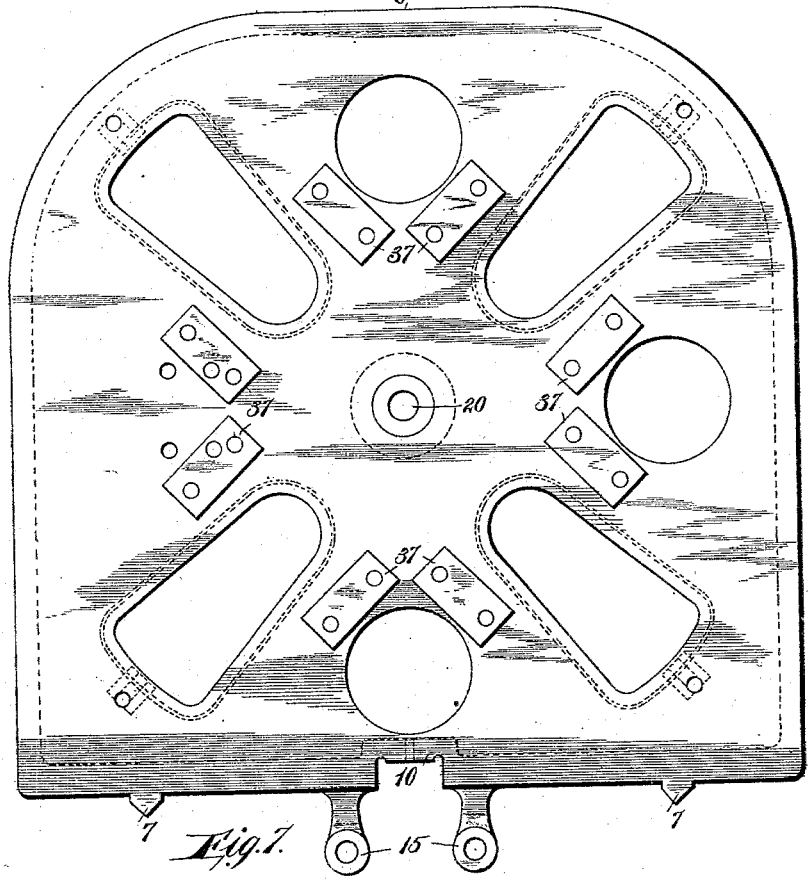
Figure 8:
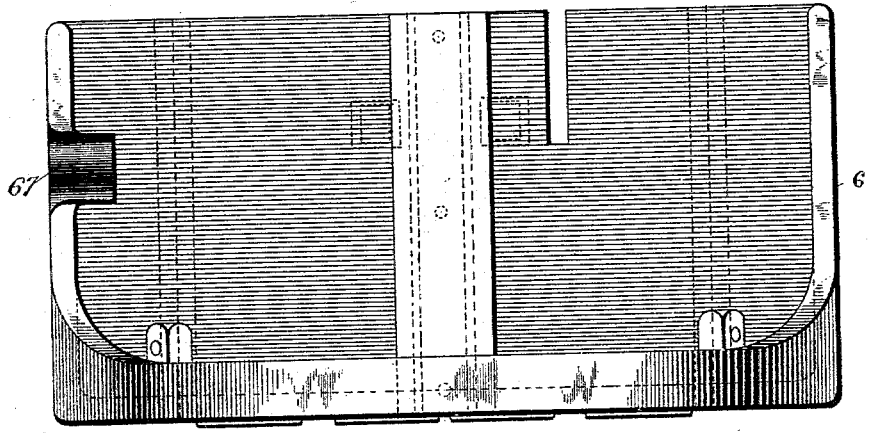

In the accompanying drawings, Figure 1 is a side elevation of my machine, showing the position of the parts before the machine begins to operate. Fig. 2 is a similar view showing the parts as in operation. Fig. 3 is a top plan view of my machine with some of the parts, for the sake of perspicuity, removed. Figs. 4 and 5 are detail views of the cross-head detached. Fig. 6 is a rear elevation of my machine. Fig. 7 is a front elevation of the traveling frame detached. Fig. 8 is a top plan view of the same. Fig. 9 is a side elevation of one of the driver-carriers detached. Fig. 10 is a top plan view of the same. Fig. 11 is an end elevation of the same, and Fig. 12 is a view of one of the hammer-rods detached. Fig. 13 is a front view of one of the stirrups; Fig. 14, a side view of the same.

In the figures of the drawings I have illustrated a machine which is designed to drive the hoops upon one end of the keg and which might be employed for the purpose of completing a keg by turning it end for end to the machine so illustrated from time to time as the hoops are driven in place. In practice, however, it is not desirable to use this method; but I prefer to employ two machines of the kind illustrated, set opposite to each other and each working upon a keg from its opposite ends at the same time.

Referring to the figures on the drawings, 1 indicates a base or foundation piece, which may be of suitable size and dimensions, and is preferably made of a heavy iron casting. It is provided upon one side with a pedestal 2, preferably cast integral with the base and provided with horizontal ways 3, within which is carried a support 4, which is designed to slide through the ways in the pedestal and to be secured therein at fixed points of adjustment by any suitable means—as, for example, abutment-screws 5.

6 indicates a movable frame-piece, which preferably consists of a heavy metal casting, provided upon its bottom with bearing-ribs 7, that slide in corresponding V-shaped bearings 8 in the base.

9 indicates a pinion meshing with racks 10 and 11 in the bottom of the movable frame and in the base, respectively, and provided with a carriage 12, from which project guide-rods 13, that move in downwardly-projecting guide-studs 15, thereby preventing twisting of the pinion. Motion is imparted to the pinion by a shaft 16, which projects from the pinion through a slot 17 in the side of the base.

18 indicates hand-levers for imparting motion to the shaft. The traveling frame carries all the operative mechanism of my machine—namely, the keg-centering mechanism, the driver-adjusting mechanism, and the driver-driving mechanism. The keg-centering mechanism consists of a shaft 19, carried in a central bearing 20 in the movable frame and by a bushing 21, to which it is secured in a suitable bearing in the support 4. Keyed to the bushing, or otherwise secured in front of the support, is a collar 22.

23 indicates a head upon the forward end of the shaft, and 24 toggle-levers pivoted thereto and also to clamping-levers 25, which are pivotally carried between pairs of lugs 26 upon the collar.

27 indicates clamping-heads upon the clamping-levers, and are designed to be entered inside the end of the keg, when, by the forward movement of the shaft 19, they are pressed firmly within the head by the toggle-lever mechanism just described. The clamping-levers being three in number the keg is by this operation readily centered and held upon the shaft. For imparting the forward movement to the shaft a bell-crank lever 28, pivoted in its angle near the bottom of the base, as indicated at 29, and at its upper end to a box 30, surrounding and revolubly carrying a bushing 31, is secured to the shaft. This lever so arranged serves also to support the rear end of the shaft 19.

It will be observed from the foregoing description that the shaft, while susceptible of a certain longitudinal movement for the purpose of centering and clamping a keg upon its forward end, is revolubly carried in the bearing 21, the support 4, and the boxing 30 upon the lever 28. The design of this construction is to afford means for the free rotation of a keg while held upon it. For this purpose I provide upon its rear end a pulley 32, which may be driven by any suitable power.

The driver-adjusting mechanism consists of driver-carriers 33, preferably oblong castings, (shown in detail in Figs. 9 and 10 of the drawings,) and are preferably four in number, as illustrated. Each is provided with a bearing-lug 34, located near its middle. It is pierced, as indicated at 35, for the admission of a pin 36, by which it may be pivotally secured to bearings 37 in the movable frame.

38 indicates a spring-block adapted to be secured to the frame, as by screw 39, and which carries a spring 40, that is designed to urge the forward end of the driver-carrier toward the center of the machine. The movement of the driver ends of the driver-carriers toward the keg is limited by an adjustment-screw 41, carried in a projection on the frame 6 and in the path of the rear end of the carrier.

42 indicates a hammer-rod designed to impinge against a pivoted driver 43. Each of the driver-carriers is provided with a hammer-rod and driver, for the operation of which the driver-adjusting mechanism is designed.

44 indicates a driver-guide lug secured to the forward end of each of the driver-carriers and of such a length as to ride upon the sides of the keg when it is in place upon the centering mechanism and when the movable frame is thrown forward into position. Thereupon they hold the driver-carriers in such position as to render the drivers operative. They are operative equally well whether the driver-carriers are at the limit of their forward throw for driving a hoop nearest the middle of the keg or whether they are carried back for driving the end hoop. The driver consists, preferably, of a somewhat peculiarly-shaped piece of steel, pivoted, as indicated at 45, within a slot 46 in the head of the driver-carrier. The shape of the driver may be described as somewhat resembling a bent wedge, being broad near its face, where it is provided with a notched striking-head 47, and being curved at its upper end, as indicated at 48, for the purpose of affording a bearing for a spring 49, secured to the top of the driver-carrier and adapted to hold it yieldingly in a position nearly perpendicular to the driver-carrier.

50 indicates hammer-rod bearings, preferably cast integrally with each of the driver-carriers and within which the hammer-rod is designed to reciprocate freely. Each of the hammer-rods is preferably provided with a movable collar 51, provided with a spring-seat 52 at each end and designed to seat springs 53 and 54, which are respectively seated at their opposite ends against spring-seats 55 and 56, that are secured in place by nuts 57, to accommodate which the hammer-rod is provided with screw-threads 58, as illustrated. By this construction the motion of the hammer-rod collar upon the rod is perfectly cushioned for a purpose that will hereinafter more fully appear.

59 indicates trunnions upon opposite sides of the hammer-rod collar.

The relation between the driver-adjusting mechanism and the driver-driving mechanism is very intimate, so that while the hammer-rod and its parts just described properly form a part of the driver-driving mechanism, yet being carried upon the driver-carriers I have thought best to describe them in detail before proceeding to a description of those parts which, in my opinion, should be regarded as belonging more properly to the driver-driving mechanism, adverting to which 60 indicates a reciprocatory cross-head carried upon the shaft 19 and adapted to be driven by suitable mechanism—as, for example, a pitman 61, pivoted to a stud 62, projecting from the side of the cross-head, and to a wrist-pin 63, carried upon an eccentric 64, adapted to be rotated by a shaft 65 from a pulley 66. The shaft is carried in a suitable bearing 67 in the side of the movable frame and in a bracket-bearing 69, projecting rearwardly from the transverse vertical wall of the movable frame. (See Figs. 3 and 6 of the drawings.) The cross-head is designed to communicate reciprocatory motion to each of the hammer-rods, constituting therewith hammer-actuating mechanism, and is therefore provided with a number of screw-threaded apertures 70, equal to the number of hammer-rods and each carrying a stirrup 71, provided with slits or openings 72 and 73, respectively, located at right angles to each other, the one adapted to straddle the collar of the hammer-rod and the other the trunnions thereof, as illustrated in Figs. 1 and 2 of the drawings.

The operation of my machine is as follows: Having set a keg in position upon the centering device and secured it in place by the movement of the shaft 19 in the manner above explained, the hoops being preferably first set loosely in position upon the keg and the movable frame having been thrown forward, so as to properly set the driver-adjusting mechanism, power is applied to the pulleys 32 and 66 to impart rotary motion to the keg and reciprocatory motion to the hammer-rods, whereupon the hoops are driven firmly into position by direct blows applied in constant and regular succession on different parts of the hoop precisely as in the ancient method of forcing them in place by hand. It will be observed that if the pulley 66 revolves slowly, which will be the case when the operator is waiting to drive the second or third hoop, the hammer-rod will have the same throw or will travel the same distance as the wrist-pin upon the eccentric 64, and that therefore the operation of the machine need not be altogether interrupted at any time in practice. In driving a hoop, however, the machine moves rapidly. The cross-head will have the same throw as before; but by reason of the elasticity of the springs in front and behind the hammer-rod collar the hammer-rods will move farther than double the throw in one direction, thus insuring the striking of the driver each time they move forward. The increased movement of the hammer-rod over that of the cross-head is due to the inertia of the bar as well as the elasticity of the spring.

In describing the construction and arrangement of my machine as I now prefer it I do not wish to appear as limiting myself to those exact details of construction, but wish to reserve the right to modify and vary them at will within the scope of my invention.

What I claim is—

1. In a hoop-driving machine, the combination of impact hoop-drivers independently movable to and fro in the direction of their driving action, mechanism for operating them to drive hoops, and mechanism for holding the packages, substantially as described.

2. In a hoop-driving machine, the combination of mechanically-operated impact hoop-drivers, with mechanism for holding the package, and means for giving one of said elements a rotary motion, whereby the drivers act at different places each time, substantially as described.

3. In barrel-supporting mechanism of a hoop-driving machine, the combination with an expansible holder, and means for operating the holder to cause it to engage a barrel, or the like, substantially as set forth.

4. In a hoop-driving machine, the combination with a plurality of pivoted strike-transmitting drivers, of driver-actuating mechanism adapted to intermittently swing the drivers to drive the hoop, substantially as and for the purpose specified.

5. In a hoop-driving machine, the combination with a plurality of independently-pivoted strike-transmitting drivers, of ramified reciprocatory driving mechanism adapted to cause the drivers to swing upon their pivots to drive the hoop, substantially as and for the purpose specified.

6. In a hoop-driving machine, the combination with mechanism for imparting rotary motion to the keg, of pivoted strike-transmitting drivers and driver-actuating mechanism adapted to intermittently swing the drivers to drive the hoop upon the keg, substantially as and for the purpose specified.

7. In a hoop-driving machine, the combination with keg-centering mechanism and pivoted drivers laterally adjustable with respect to the keg, of reciprocatory driver-actuating mechanism adapted to cause the drivers to swing upon their pivots to drive a hoop or the like, substantially as and for the purpose specified.

8. In a hoop-driving machine, the combination with rotary expansible keg-centering mechanism, of strike-transmitting pivoted drivers and driver-actuating mechanism adapted to swing the drivers and cause them to drive the hoop upon the keg, substantially as and for the purpose specified.

9. In a hoop-driving machine, the combination with a frame, pivoted strike-transmitting drivers and driver-actuating mechanism adapted to swing the drivers to cause them to drive the hoop, of a revoluble and longitudinally-movable shaft, toggle-lever mechanism at the end thereof designed to be expanded against the inside of the keg to center, support and rotate the same while the hoop is being driven to place, substantially as and for the purpose specified.

10. In a hoop-driving machine, the combination with a frame and keg-support, of a movable driver and a reciprocatory driving-rod adapted to strike the movable driver to drive the hoop to place, substantially as and for the purpose specified.

11. In a hoop-driving machine, the combination with keg-centering mechanism, of a plurality of pivoted driver-carriers yieldingly urged toward the centering mechanism, of pivoted drivers carried thereon, guide-lugs upon the driver-carriers adapted to ride upon the keg to guide the pivoted drivers, and driver-actuating mechanism in operative relation with but not connected to said drivers, substantially as and for the purpose specified.

12. In a hoop-driving machine, the combination with a base, and movable frame carried thereon, and hoop-driving mechanism carried upon the movable frame, of keg centering and supporting mechanism carried by the movable frame and base, substantially as and for the purpose specified.

13. In a hoop-driving machine, the combination with a frame, of a driver-carrier, driver, driver-rod, yielding rod-collar, and mechanism for imparting reciprocatory motion to said collar, substantially as and for the purpose specified.

14. In a hoop-driving machine, the combination with a frame, of driver-carriers pivoted thereon, means for tilting the carriers, drivers on the carriers and independent driver-actuating mechanism to cause the driver to drive a hoop, substantially as and for the purpose specified.

15. In a hoop-driving machine, the combination with a frame, of driver-carriers pivoted thereon, means for tilting the carriers, pivoted drivers on the carriers and independently reciprocatory driver-actuating mechanism, substantially as and for the purpose specified.

16. In a hoop-driving machine, the combination with a frame, of driver-carriers pivoted thereon, pivoted drivers on the driver-carriers, and reciprocatory driver-rods adapted to actuate the drivers, substantially as and for the purpose specified.

17. In a hoop-driving machine, the combination with a base and movable frame thereon, of drivers, mechanism for guiding the drivers laterally with respect to the keg, and reciprocatory driver-actuating mechanism carried upon the movable frame, and keg centering and supporting mechanism supported by the movable frame and base, substantially as and for the purpose specified.

18. In a hoop-driving machine, the combination with a frame, drivers and ramified driver-actuating mechanism adapted to strike the drivers and cause them to drive the hoop, of a revoluble longitudinally-movable shaft and toggle-lever mechanism on the end thereof designed to be expanded against the inside of the keg to center and support the same by the longitudinal movement of the shaft, substantially as and for the purpose specified.

19. In a hoop-driving machine, the combination with a frame, drivers and driver-actuating mechanism adapted to strike the drivers and cause them to drive the hoop, of a revoluble longitudinally-movable shaft, mechanism on the end thereof designed to center and support the keg in order that the same may be rotated by the rotation of the shaft and a bell-crank lever operatively connected to said shaft to reciprocate the same to actuate the centering and supporting mechanism, substantially as and for the purpose specified.

20. In a hoop-driving machine, the combination with a plurality of pivoted drivers and independently reciprocatory hammer-rods, of a reciprocatory cross-head operatively connected with the driver-rods and coöperating therewith to cause the drivers to swing upon their pivots to drive a hoop, substantially as and for the purpose specified.

21. In a hoop-driving machine, the combination with a base, and movable frame, of a revoluble longitudinally-movable shaft and keg centering and supporting mechanism on the end thereof, driver-carriers pivoted upon the frame, pivoted drivers, reciprocatory driver-rods upon the hammer-carriers and a reciprocatory cross-head upon the shaft, operatively connected with the driver-rods, substantially as and for the purpose specified.

22. In a hoop-driving machine, the combination with a frame and driver-carriers pivoted thereon, pivoted drivers and reciprocatory driver-rods upon the driver-carriers, of a reciprocatory cross-head and mechanism operatively connecting the same with the driver-rods adapted to allow the tilting of the driver-carriers to and from the cross-head, substantially as and for the purpose specified.

23. In a hoop-driving machine, the combination with a frame, of a plurality of driver-rods and yielding rod-collars of a reciprocatory cross-head operatively connected with and adapted to impart reciprocatory motion to said rod-collars, substantially as and for the purpose specified.

24. In a hoop-driving machine, the combination with a frame, of pivoted driver-carriers thereon, drivers and independent driver-actuating mechanism also carried thereon, of an adjustment-screw for adjustably limiting the tilting of the driver-carriers in one direction, substantially as and for the purpose specified.

In testimony of all which I have hereunto subscribed my name.

ALBERT LIEBER.

Witnesses:
HERMAN HABICH,
CHAS. KLEIN.